United States Patent
Takaiwa et al.

[11] Patent Number: 5,875,280
[45] Date of Patent: Feb. 23, 1999

[54] RECORDING APPARATUS HAVING VARIABLY SETTABLE COMPRESSION RATIO

[75] Inventors: Kan Takaiwa; Saburo Nakazato, both of Tokyo, Japan

[73] Assignee: Canon Kabushiki Kaisha, Tokyo, Japan

[21] Appl. No.: 409,882

[22] Filed: Mar. 21, 1995

Related U.S. Application Data

[63] Continuation of Ser. No. 304,594, Sep. 12, 1994, abandoned, which is a continuation of Ser. No. 996,499, Dec. 23, 1992, abandoned, which is a continuation of Ser. No. 675,547, Mar. 25, 1991, abandoned.

[30] Foreign Application Priority Data

Mar. 29, 1990 [JP] Japan .................................. 2-81718
Apr. 6, 1990 [JP] Japan .................................. 2-91417
Nov. 14, 1990 [JP] Japan .................................. 2-308069

[51] Int. Cl.⁶ .................................................. H04N 5/225

[52] U.S. Cl. ........................................ 386/120; 386/124

[58] Field of Search ................................. 360/9.1, 33.1, 360/27, 32, 8, 10.1, 10.3, 25, 48, 53; 358/906, 335; 386/120, 124; 348/207

[56] References Cited

U.S. PATENT DOCUMENTS

| | | | |
|---|---|---|---|
| 3,869,708 | 3/1975 | Schiffman | 360/25 X |
| 4,608,609 | 8/1986 | Takano et al. | 360/9.1 X |
| 4,965,675 | 10/1990 | Hori et al. | 360/19.1 X |
| 5,006,936 | 4/1991 | Hooks, Jr. et al. | 360/9.1 X |
| 5,018,017 | 5/1991 | Sasaki et al. | 358/209 |
| 5,032,927 | 7/1991 | Watanabe et al. | 358/335 |
| 5,065,259 | 11/1991 | Kubota et al. | 360/9.1 X |
| 5,068,744 | 11/1991 | Ito | 358/310 |
| 5,198,940 | 3/1993 | Nagasawa et al. | 360/9.1 |
| 5,200,962 | 4/1993 | Kao et al. | 371/41 |
| 5,381,276 | 1/1995 | Choi | 360/51 |
| 5,430,579 | 7/1995 | Onishi et al. | 360/9.1 |

*Primary Examiner*—Andrew L. Sniezek
*Attorney, Agent, or Firm*—Robin, Blecker & Daley

[57] ABSTRACT

A recording apparatus for recording onto a recording medium for each unit of block, with a unit of block being image data representing one picture, comprising a compression circuit for variably setting a compression ratio in the compression processing which is applied to the image data, in accordance with the supply timing for the above unit of block corresponding to the continuous mode, and an error correction adding circuit for variably setting the way of attaching error correction codes which are added to the above data, in accordance with the compression ratio being set as above.

13 Claims, 10 Drawing Sheets

*FIG. 10A*

| P1 → P17 | P3 → P19 | P5 → P21 | P7 | P9 | P11 | P13 | P15 |
|---|---|---|---|---|---|---|---|
| P2 → P18 | P4 → P20 | P6 | P8 | P10 | P12 | P14 | P16 |

*FIG. 10B*

| P1 → P33 | P3 → P35 | P5 | P7 | P9 | P11 | P13 | P15 |
|---|---|---|---|---|---|---|---|
| P2 → P17 | P4 → P18 → P25 | P6 → P19 | P8 → P20 → P26 → P29 | P10 → P21 | P12 → P22 → P27 | P14 → P23 | P16 → P24 → P28 → P30 → P31 |

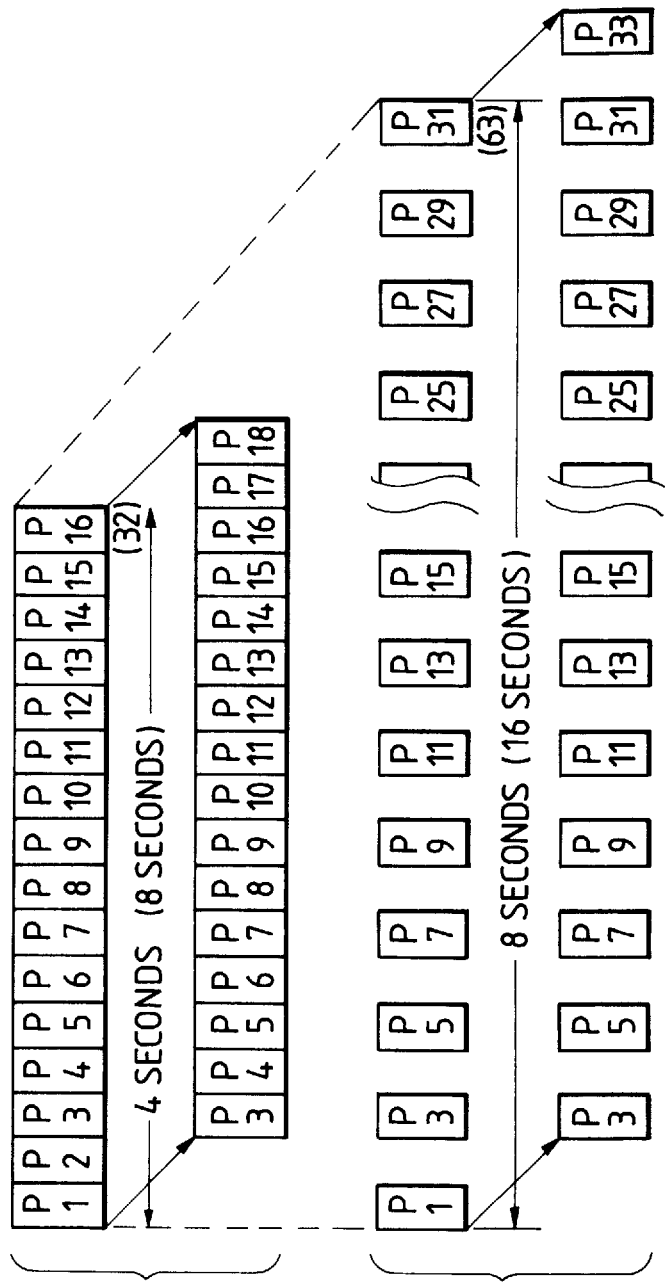

RECORDING APPARATUS HAVING VARIABLY SETTABLE COMPRESSION RATIO

This is a continuation application under 37 CFR 1.62 of prior application Ser. No. 08/304,594, filed Sep. 12, 1994, which is a continuation of Ser. No. 07/996,499, filed Dec. 23, 1992, abandoned, which is a continuation of Ser. No. 07/675,547, filed Mar. 25, 1991, abandoned.

BACKGROUND OF THE INVENTION

1. Field of the Invention

The present invention relates to a recording apparatus for recording video or other signals on a recording medium such as a magnetic tape.

2. Related Background Art

Conventionally, a magnetic recording/reproducing apparatus is well known in which various digital signals such as video or voice signals are recorded on a magnetic tape contained in a small cassette, and in which the processings such as signal processing or recording/reproducing are performed by transmitting above information signals to a transmission system within the apparatus at a predetermined transmission rate.

By the way, the transmission rate of signals on the magnetic recording/reproducing apparatus as above described is desirably lower in relation to the processing speed of various signals.

However, if the transmission rate is lowered, it takes a long recording time to record video signals having a large amount of information.

That is, if the transmission rate is set at about 768 Kbit/sec {2(ch)×32(kHz)×12(bit)} which is sufficient for the transmission of voice signals, it takes about 4.8 sec to record video signals of one frame [3.7M bit {640 (pixels)×480 (pixels)×1.5(Y+C)}] which is not quite sufficient for video image.

Thus, for example, when the magnetic recording/reproducing apparatus as above described is used as an electronic still camera, there is a disadvantage that as the shutter timing is restrained by the time required for recording, the continuous photographing function (continuous photographing speed) for recording video signals corresponding to a plurality of sheets in a short time is also restrained.

Further, in order to shorten the recording time, the above-mentioned transmission rate may be increased, but if the tape running speed is always increased to do so, the consumption power will be undesirably increased so that the battery life of a portable electronic still camera is shortened.

Further, for recording a relatively large amount of image data onto a recording medium, an applicant of the present application has proposed, in Japanese Patent Application No. 2-13976 published on Sep. 25, 1991 as Japanese Laid-Open Patent Application No. 3-218190, a continuous photographing function in which image data corresponding to a plurality of sheets are first recorded in a semiconductor memory (buffer memory), and then image data read from the above memory are recorded onto the recording medium after the continuous photographing operation is terminated.

However, in this recording apparatus comprising such semiconductor memory, there is a limitation in the capacity of the semiconductor memory even though the recording medium has a sufficient capacity. There is thus a disadvantage that the continuous photographing operation over a long period is difficult.

Further, as such a long time continuous photographing for such a long time is impossible. For example, when starting the continuous photographing operation at the earlier time, there was a fear that the shutter chance would be lost because the continuous photographing operation was terminated before being able to photograph a desired scene.

SUMMARY OF THE INVENTION

In view of the foregoing, an object of the present invention is to resolve the above-mentioned various disadvantages encountered in recording a relatively large amount of data such as video signals, while the transmission rate is not increased.

To accomplish the above object, an embodiment of the present invention provides a recording apparatus for recording onto a recording medium for each unit of block, with a unit of block being image data for representing one picture, comprising variably setting a compression ratio in the compression processing which is applied to the above image data, in accordance with the supply timing of the above unit of block corresponding to the continuous photo mode, and variably setting the way of attaching error correction codes which are added to the above data, in accordance with the setting of the above compression ratio.

According to the embodiment with the above constitution, it is possible to resolve a disadvantage encountered in manipulating a large amount of data such as video information at a lower transmission rate.

That is, by switching the compression ratio of the data compression applied to image data in accordance with the continuous photographing mode, and switching the way of attaching error correction codes in accordance with the compression ratio of the data compression, the degradation of image quality can be suppressed in to a minimum. This is because performing the continuous photographing, the data compression is applied in accordance with the continuous photographing speed, i.e., the supply timing for each image for representing one picture (a unit of block) the error correction codes are attached in accordance with the compression ratio of data which varies the redundancy of data. Thereby, the continuous photographing speed can be increased while being at a lower transmission rate.

Another embodiment of the present invention is an image recording apparatus for recording still image onto a tape-like recording medium, including a single recording mode for recording a single image, and a continuous recording mode for recording a plurality of images in predetermined time intervals, characterized by a continuous recording mode during which, a capstan for running the above-mentioned tape-like recording medium and a rotary head for recording signals onto the tape-like recording medium are rotated faster than at the single recording mode, so that image is recorded by compressing at a predetermined compression ratio.

With the above means, the recording speed at the continuous recording can be increased without raising the consumption power at the single recording, so that the continuous photographing recording at higher speed can be fulfilled.

In view of the above described situation, an object of the present invention is to provide a recording apparatus enabling the continuous photographing operation over a long time and without losing a shutter chance.

Another embodiment of the present invention is a recording apparatus for storing image data obtained by converting the picked up light into memory means, and then recording image data output from the memory means onto a recording medium, wherein when the continuous photographing operation is continued, old image data stored in the above memory means are rewritten with new image data sequentially, and after image data obtained by converting the picked up light are compressed and stored into the memory means, image data output from the memory means are recorded onto the recording medium, characterized by the compression ratio in the above compression processing being variably set in accordance with the continuous photographing duration.

According to the present embodiment with the above constitution, when the continuous photographing operation is continued, image data immediately before termination of the continuous photographing operation can be left in the above memory means by rewriting old image data in the memory means with new image data sequentially. Thereby, losing a shutter chance can be prevented beforehand.

Further, for the storage into memory means with the compression processing applied, if the compression ratio is variably set in accordance with the continuous photographing duration, for example, if the compression ratio is higher when the continuous photographing time is longer, the number of sheets storable in the memory means is increased, thereby enabling a long time continuous photographing operation.

BRIEF DESCRIPTION OF THE DRAWINGS

FIGS. 10A and 10B are views typically showing storage contents in memory means.

FIGS. 11A and 11B are views typically showing the relations between the continuous photographing time and image data.

Other objects and features of the present invention will become apparent from the following description in conjunction with the drawings.

DETAILED DESCRIPTION OF THE PREFERRED EMBODIMENT

A preferred example according to the present invention will be described in detail with reference to the drawings.

Figure 1:
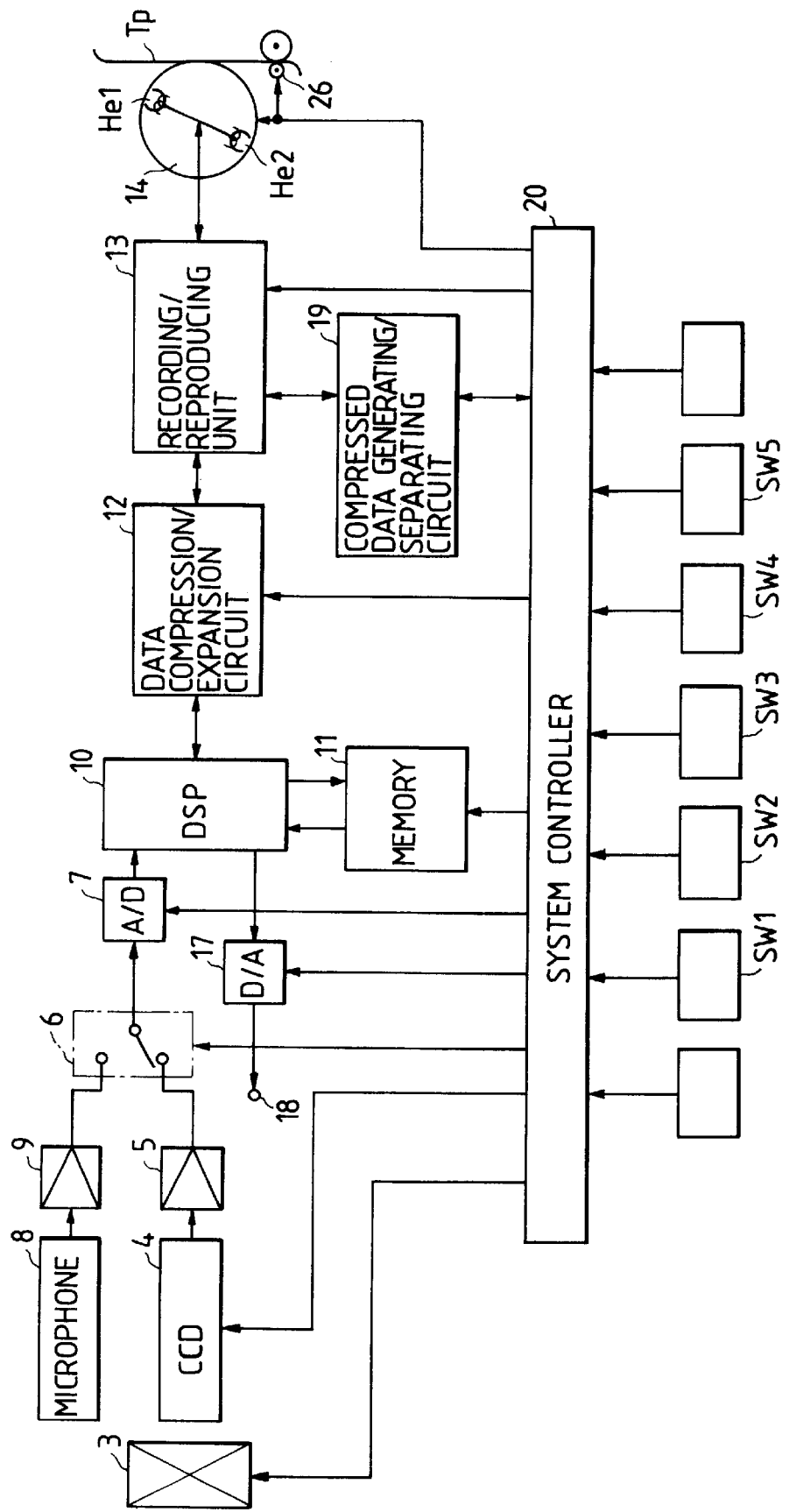
FIG. 1 is a block diagram showing an embodiment of a recording apparatus according to the present invention.
Figure 2:
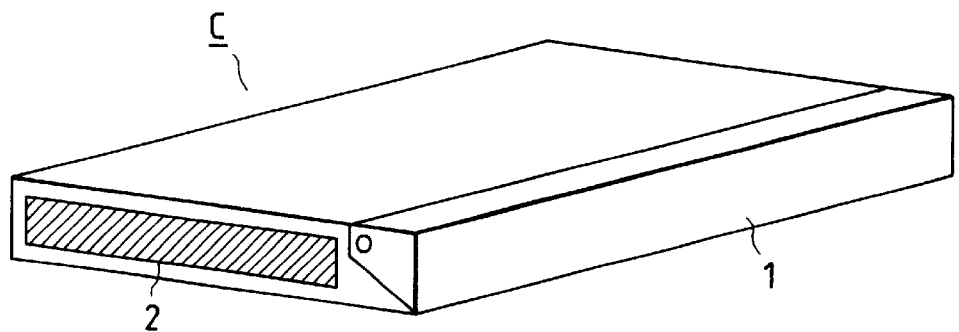
FIG. 2 is a perspective view showing a cassette according to the present invention.

FIG. 1 is a block diagram showing a configuration of one embodiment of a magnetic recording apparatus such as an electronic still camera to which the present invention is applied, wherein the present embodiment is to record magnetically a relatively large capacity of video signals or a relatively small capacity of voice signals digitized on a magnetic tape contained within a small cassette as shown in FIG. 2.

The above cassette C contains a magnetic tape Tp wound between a pair of tape reels disposed within a cassette main case as shown in FIG. 2, with this magnetic tape facing outward through a lid 1 placed on a front face of cassette. On a side face of the cassette C is formed a magnetic recording unit 2, which has recorded the index information as to the quantity of recording in the magnetic tape, as will be described later.

On the other hand, in the embodiment of using the magnetic tape within the cassette C as above described as a recording medium, the light picked up from a subject enters via an optical system 3 having an iris mechanism and an automatic focusing mechanism into a sensor 4 composed of CCD (charge coupled device), and is converted from an optical to an electric entity, and a video signal obtained thereby is amplified by a predetermined amount in a preliminary amplifier 5 and then converted via a switch circuit 6 into digital signals consisting of a predetermined number of bits in an A/D (analog/digital) converter 7. Note that the sampling frequency of the A/D converter 7 in this example is the same as the driving frequency of the sensor 4, with the quantization bit being 8 bits. Further, in the present example, the voice input from a voice input device 8 such as a microphone, after being amplified by a predetermined amount in a preliminary amplifier 9, is supplied via the above switch circuit 6 into the A/D converter 7 as above described.

The digital video or voice signals, after a predetermined signal processing in a digital signal processing apparatus (DSP) 10, are once stored in a memory circuit 11 having the storage capacity of at least one frame, and the video or voice signals stored therein are sequentially read, supplied via the digital signal processing circuit 10 as above described into a data compression/expansion circuit 12, where they are subjected to the data compression processing in accordance with the continuous photographing mode for enabling continuously a plurality of photographing operations in a unit of time, or the single photographing mode, and supplied to a recording/reproducing unit 13, where they are recorded into a magnetic tape Tp within a cassette mounted on the cassette mounting section.

Further, the recording/reproducing unit 13 as above described is supplied with data concerning the compression ratio from a compression ratio data generating/separating circuit 19, which are stored together with image data in a predetermined position of the magnetic tape Tp, e.g., a subcode area.

These compression ratio data are separated from image data to be reproduced in the compression ratio data generating/separating circuit 19 as above described, when reproducing, and supplied into a system controller 20 as will be described later.

Figure 3:
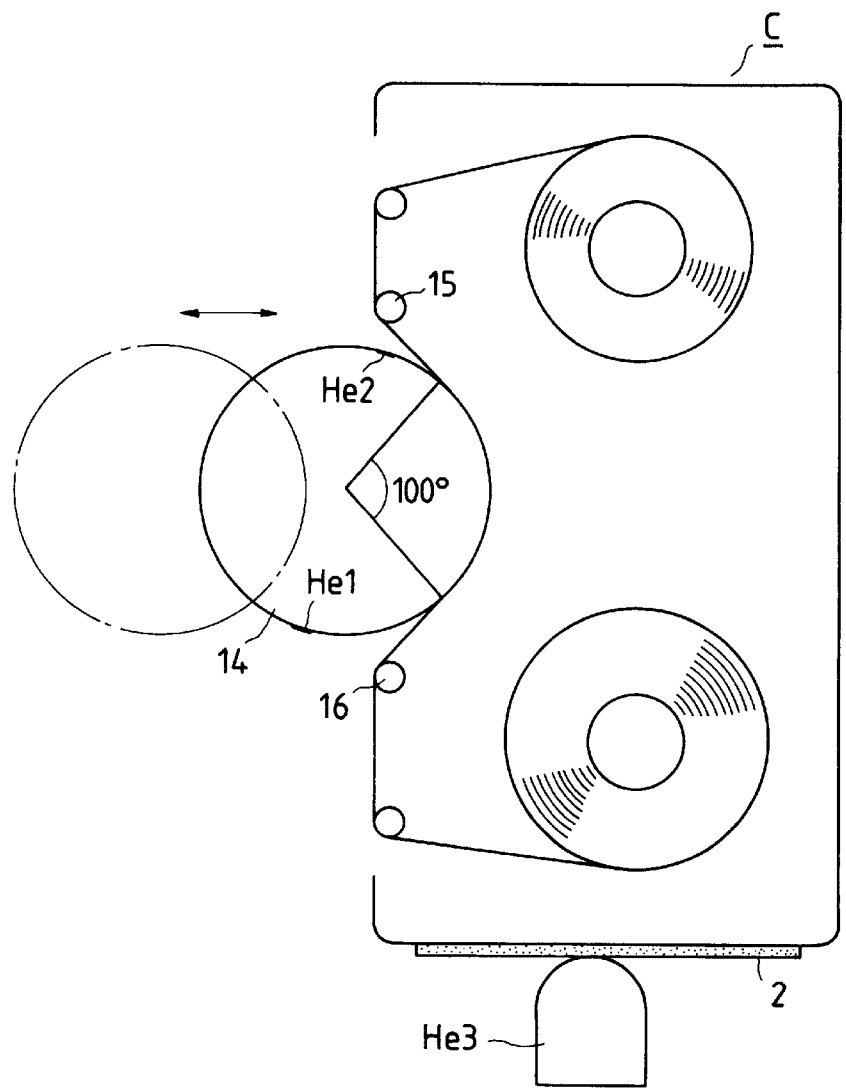
FIG. 3 is a schematic plan view showing the detail of a cassette mounting portion.

The recording/reproducing unit 13 as above described comprises a rotary drum 14, having two rotary heads He1, He2 for recording and reproducing video or voice signals on the above-mentioned tape Tp, in which the rotary drum 14 moves toward an inside of cassette C, as shown in FIG. 3, at the stage where the cassette is mounted on the cassette mounting section in the recording/reproducing unit 13, and presses down on a magnetic tape which is guided by tape guides 15, 16 on a front face of the cassette.

As a result, in this example, the magnetic tape can be wound around an external periphery of the rotary drum as above mentioned over an angular range of about 100° without loading.

The rotary drum 14 as above shown is inclined by a predetermined angle in the longitudinal direction of magnetic tape, so that the video or voice signals and the picked up information (index signals) as will be described later are recorded obliquely on the magnetic tape by running the magnetic tape with tape feed means 26 at a predetermined speed being set in accordance with the compression ratio while rotating the rotary drum 14 at a predetermined speed being set in accordance with the compression ratio. Note that a predetermined load is applied to the feed system of tape Tp, and thereby a predetermined contact pressure between the magnetic tape and the rotary head can be obtained.

On the other hand, when reproducing, the reproduction outputs from the magnetic heads He1, He2 as above descrived, which can be obtained by driving the above-mentioned rotary drum 14 and the tape Tp at a predetermined speed in accordance with the compression ratio, are supplied via the recording/reproducing unit 13 to the data compression/expansion circuit 12, where they are processed for a predetermined error correction and the data expansion, and then are once stored via DSP10 in the memory circuit 11.

Afterwards, the reproduction image data read from the memory circuit 11 are supplied via the above DSP10 into the digital-analog (D/A) converter 17 to be converted into an analog signal, and then output via an output terminal 18.

Each unit as above described in this example is controlled for the operation by a system controller (thereafter called "syscon") comprised of a microcomputer or the like.

This syscon 20 performs the mode setting and operation control of each unit as above described, in accordance with an instruction from various operation switches connected thereto such as a release switch SW1, a continuous photo/single photo changeover switch SW2, a continuous photo mode setting switch SW3, a reproduction switch SW4, or a power switch SW5.

That is, the syscon 20 controls the conversion operations of the A/D converter 7 and the D/A converter 17, as well as the focus and iris operations in the optical system 3 as above described, and further, controls the switching operation in the switch circuit 6 as above described, or the writing and reading operations in the memory circuit 11 as above described.

Further, the syscon 20 outputs a continuous photo/single photo changeover signal C/S and a continuous photo speed changeover signal H/L in accordance with the operations of the continuous photo/single photo changeover switch SW2 and the continuous photo mode setting switch SW3, as above described, respectively, and performs the photographing operation (exposure timing, etc.) control of the sensor 4 as above described, the variable setting of the compression ratio in the data compression circuit 12 as above described, and the setting control of the load amount for the correction code corresponding to a variable setting of the compression ratio, by the changeover signals C/S, H/L, and wherein the compression ratio data generating/separating circuit 19 as above described generates the compression ratio data concerning the data compression ratio and the load amount of error correction code, based on these changeover signals C/S, H/L, and supplies them to the recording/reproducing unit 13 as above described. Further, the syscon 22 sets variably the rotation speed of the rotary drum 14 as above described, and the running speed of tape Tp, in accordance with the compression ratio.

Note that the compression ratio data are separated and extracted from the reproduction image data, and supplied to the syscon 20, which controls the data compression/expansion circuit 12 as above described, based on the compression ratio data.

Further, the syscon 20 as above described sets the whole apparatus to a recording mode with the operation of the above-mentioned power switch SW5, and sets the data compression/expansion circuit 12 and the compression ratio data generating/separating circuit 19 to a reproduction mode in accordance with a recording/reproducing changeover signal R/P output with the operation of the above-mentioned reproduction switch SW4.

Next, the operation and configuration of the data compression/expansion circuit 12 which is controlled in accordance with each of the changeover signals C/S, H/L, R/P as above described will be described in detail with reference to FIGS. 4 and 5.

Figure 4:
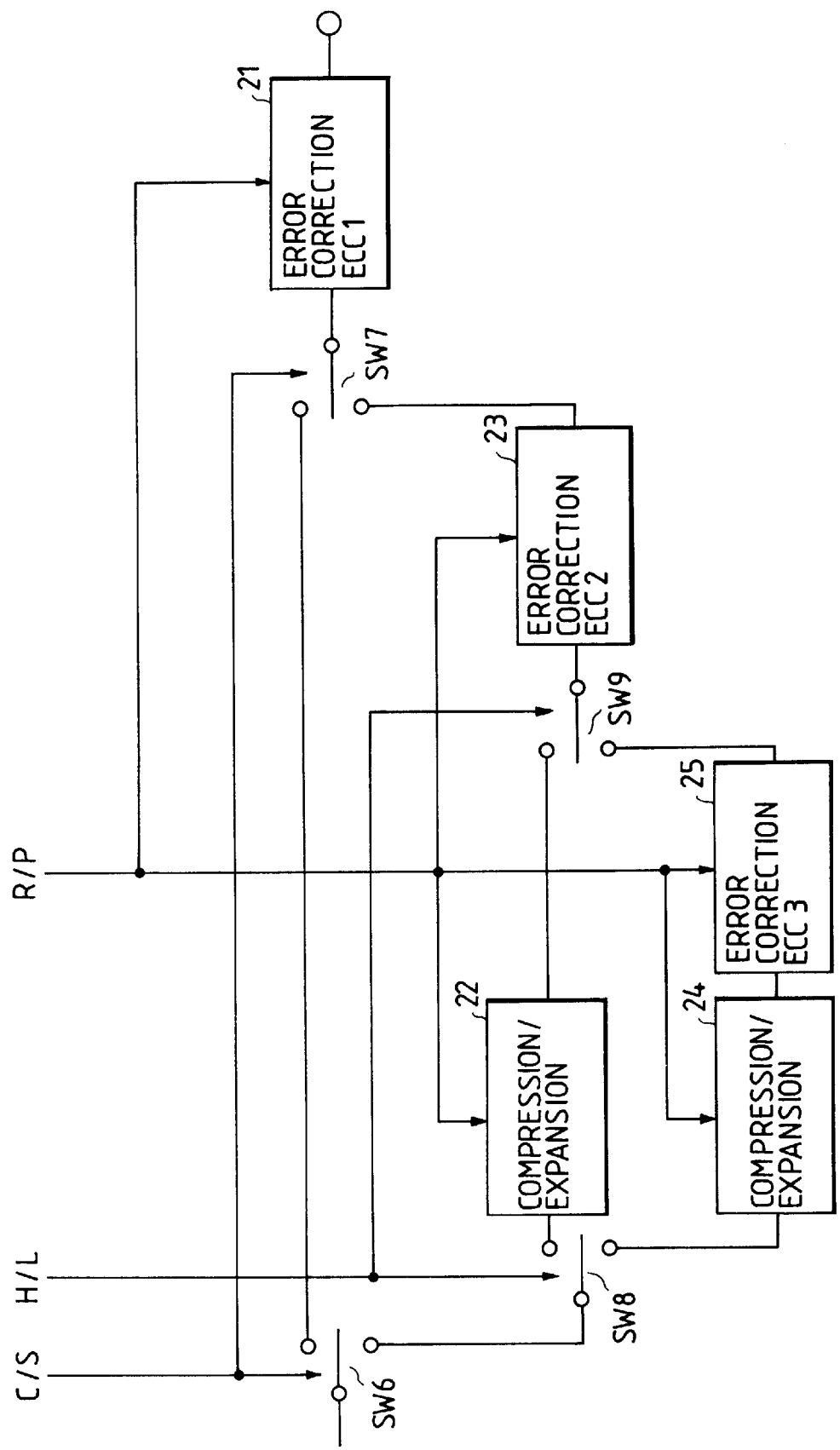
FIG. 4 is a view showing a configuration of a data compression/expansion block in a recording apparatus according to the present invention.

FIG. 4 is a block diagram showing a configuration of the data compression/expansion circuit 12 as above described, and FIG. 5 contains views typically showing the relations between the exposure timings and the processing times in the single photo mode and the continuous photo mode at the recording mode.

Figure 5A:
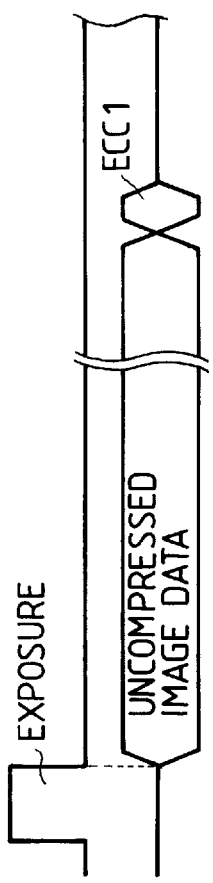
FIGS. 5A–5C are timing charts for typically showing the relations between the exposure timing and the processing time in recording.

First, the image recording in the single photographing mode will be described. As shown in FIG. 5A, image data obtained by one time of exposure and supplied from the digital signal processing circuit 10 are entered into the switch SW6 changeable with a continuous photo/single photo changeover signal C/S supplied from the above-mentioned syscon 20, and passed through SW7 into a first error correction circuit 21. The first error correction circuit 21, which is in the recording mode, attaches the same error correction code ECC1 as that in normal voice recording, to non-compressed image data input from the switch SW6, and outputs them to the recording/reproducing circuit 13.

Figure 5B:
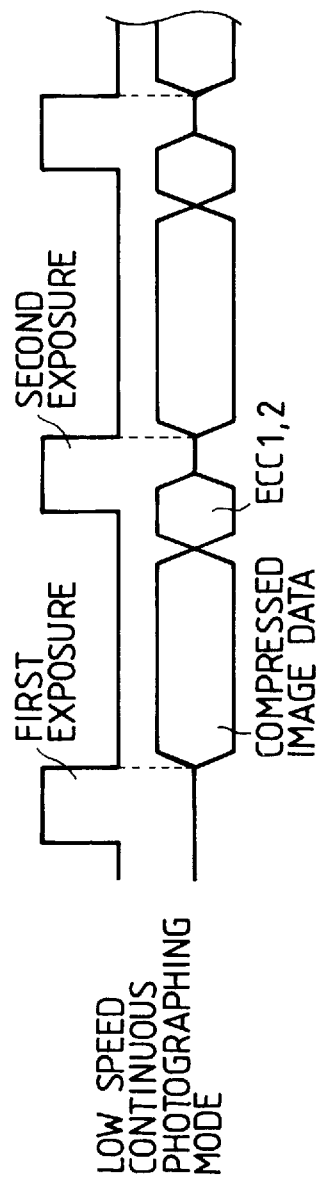

On the other hand, in the continuous photographing, image data input into the switch SW6 are entered into the switch SW8 changeable with a continuous photo speed changeover signal H/L which is supplied from the above-mentioned syscon 20. Image data entered into the switch SW8 are entered into the first data compression/expansion circuit 22 at the low-speed continuous photographing. The first data compression/expansion circuit 22, which is in the recording mode at this time, applies the data compression using the redundancy of image to image data input from the switch SW8 as shown in FIG. 5B. Here, the first data compression/expansion circuit 22 has a relatively low compression ratio, e.g., the data compression ratio of about ¼, to supply data via the switch SW9 changeable with a changeover signal H/L to a second error correction circuit 23. The second error correction circuit 23, which is also in the recording mode, attaches the second error correction code ECC2 to the compressed image data supplied from the switch SW9 to compensate for a reduced redundancy of image data due to the data compression in the first data compression/expansion circuit 22, and supplies them to the switch SW7 as above described.

Figure 5C:
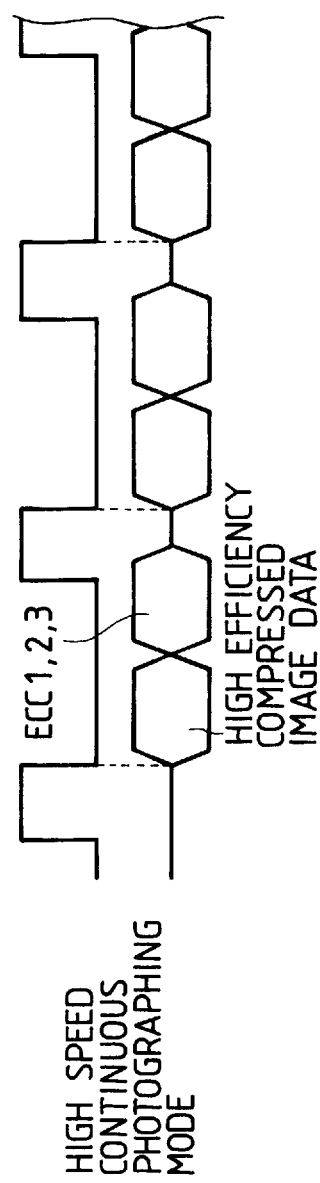

In the high speed continuous photographing mode, image data input into the switch SW8 is supplied into the second data compression/expansion circuit 24. The second data compression/expansion circuit 24, which is also placed in the recording mode, applies the data compression using the redundancy of image to image data input via the switch SW8 as shown in FIG. 5C, but with a higher compression ratio than that of the first data compression/expansion circuit 22, e.g., about 1/16, and supplies them to a third error correction circuit 25. The third error correction circuit 25, which is also placed in the recording mode, attaches the third error correction code ECC3 to the high efficiency compressed image data input from the second data compression/expansion circuit 24 in order to compensate for a reduced redundancy of image data due to the data compression in the second data compression/expansion circuit 24, and supplies them to the switch SW9.

As a result, in the single photo mode, the data compression is not made, and data with the first error correction code ECC1 only added are recorded, while in the low-speed continuous photo mode, the data compression with a low compression ratio is made, and data with first and second error correction codes ECC1, ECC2 added are recorded, and further, in the high-speed continuous photo mode, the data compression with a high compression ratio is made, and data with first, second and third error correction codes ECC1, ECC2 and ECC3 added are recorded. While in the low-speed transmission rate, as the data compression ratios are different with the continuous photo modes, the times required for the recording of whole image data are also different, which makes the continuous photo speed for each continuous photo mode feasible.

Note that each of the first and second compression/expansion circuits 22, 24, as above described in this embodiment, is provided with a data compressor and a data expander arranged in parallel to each other, wherein the connection of the compressor and the expander to the input/output terminals at each compression/expansion circuit 22, 24 is made under the switching control by the recording/reproducing changeover signal R/P as above described. As a result, each compression/expansion circuit 22, 24, as above described, serves as the compressor in the recording mode, while serving as the expander in the reproducing mode.

Similarly, the first to third error correction circuits 21, 23, 25 are each provided with an error correction code adder (encoder) and a correction circuit (decoder), and serve as the encoder in the recording mode, and the decoder in the reproduction mode, under the switching control by the recording/reproducing changeover signal R/P as above described.

Further, in this embodiment, the first and second compression/expansion circuits 22, 24 and the first to third error correction circuits 21, 23, 25 each performs the driving at the same transmission rate.

Next, the reproduction time will be described. The first, second and third error correction circuits and the first and second data compression/expansion circuits are placed in the reproduction mode by a changeover signal R/P supplied from the syscon 20 as previously described. The reproduced image data reproduced from the magnetic tape Tp and output by the recording/reproducing circuit 13 are input into the first error correction circuit 21, where data errors accompanied by the magnetic recording and reproduction are corrected based on the correlation between correction code and data, and supplied to the switch SW7. Image data input into the switch SW7 is changed by a changeover signal C/S which is supplied on the basis of the compressed data extracted from reproduced image data by the syscon 20 as above described, when reproducing a single photo image, and supplied via the switch SW6 into the digital signal processing circuit 10.

Further, the syscon 20 sets the running speed of tape Tp and the rotation speed of the drum in accordance with the compressed data as above described.

On the other hand, when reproducing a continuous photo image, image data input into the switch SW7 is supplied into the second error correction circuit 23. The second error correction circuit 23 corrects data errors left in the first error correction circuit 21 without being corrected due to a reduced redundancy of image data with the data compression, and subsequently supplies data to the switch SW9. Image data input into the switch SW9 is entered into the first data compression/expansion circuit 22, when reproducing a low-speed continuous photo image. The first data compression/expansion circuit 22 applies the data expansion using the redundancy of image to image data input from the switch SW7, and supplies expanded data via the switches SW8, SW6 into the digital signal processing circuit 10.

When reproducing a high-speed continuous photo image, image data input into the switch SW9 is supplied to the third error correction circuit 25. The third error correction circuit 25 corrects data errors left in the second error correction circuit 23 without being corrected because of a more reduced redundancy of image data with the data compression in the second data compression/expansion circuit 24, for the supply to the second data compression/expansion circuit 24. The second data compression/expansion circuit 24 applies the data expansion also using the redundancy of image to image data supplied from the third error correction circuit 25, and supplies expanded data via the switches SW8, SW6 into the digital signal processing circuit 10.

As can be clearly understood from the above description, according to this example, some disadvantages in manipulating a large amount of video information at lower transmission rate can be resolved.

That is, by changing the compression ratio for the data compression applied to image data in accordance with a continuous photo mode, by changing the way of attaching the error correction code in accordance with the compression ratio for the data compression, the data compression in accordance with a continuous photo speed is applied in performing the continuous photo, and error correction codes are added in accordance with the data compression ratio, so that the degradation of image accompanied by the high efficiency compressed processing can be suppressed to a minimum. As a result, according to this embodiment, the continuous photo speed can be increased at still lower transmission rates, in the situation where the degradation of data is suppressed.

Note that though in the above embodiment, the way of attaching the error correction code is changed by providing three-stage error correction circuits in the data compression/expansion circuit 10 as above described, and by using accumulatively those error correction circuits in accordance with an operation mode, the present invention is not limited to such a configuration, but may be constituted, for example, by using selectively a plurality of error correction circuits which are different in the ways of applying the error correction.

Further, in this embodiment, when recording in the single photo mode, the compression of image data is not applied, but the compression can also be applied, in which case the recording medium such as a magnetic tape can be saved.

As will be clear from the above description, according to the present example, by recording each unit of block, a unit of block having a predetermined amount of data, at a variable data compression ratio in accordance with each mode which provides the different supply timings for the unit of block, data for each unit of block can be recorded within an interval of the supply timing.

Further, according to the present embodiment, the degradation of image quality associated with a compression ratio can be prevented by changing the way of attaching the error correction code in accordance with the compression ratio which is variably set as above described.

Further, when such embodiment is applied to a recording apparatus comprising the continuous photo and single photo features, the continuous photo capability cannot be reduced and the degradation of image can be suppressed to a minimum.

Next, another example of the present invention will be described.

Figure 6:
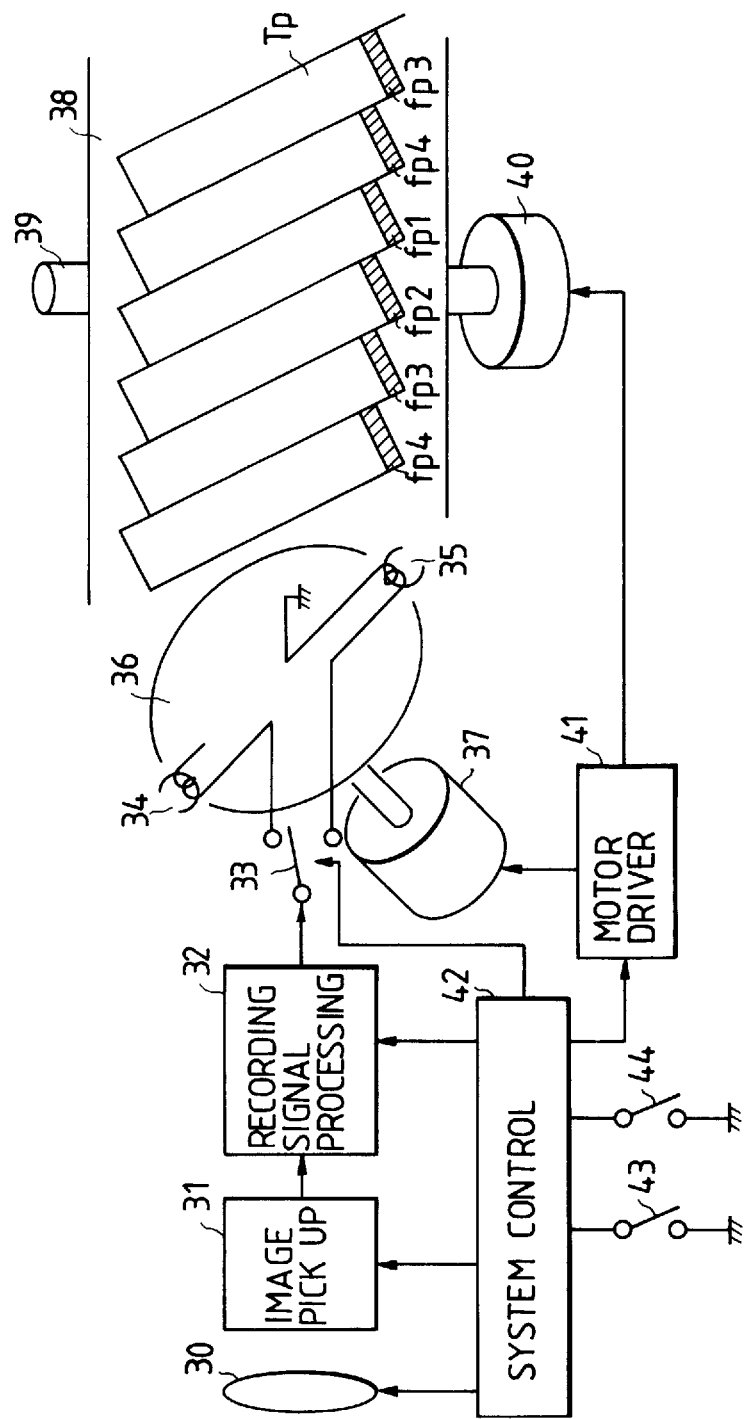
FIG. 6 is a constitutional block diagram of one embodiment of the present invention.

FIG. 6 shows a constitutional block diagram of another embodiment according to the present invention. 30 is a photographing optical system, 31 is an image pick up circuit for converting a subject image to an electric signal, 32 is a recording signal processing circuit for processing the recording signal output of the image pick up circuit 31, 33 is a head changeover switch, 34 and 35 are magnetic heads mounted opposed 180° to each other on a rotary drum 36, and 37 is a drum motor for rotating the rotary drum 36. 38 is a magnetic tape which is a recording medium, 39 is a capstan, and 40 is a capstan motor for rotating the capstan 39. The rotary drum 36 is mounted slantingly in the longitudinal direction of the magnetic tape 38. 41 is a motor driving circuit for driving the motors 37, 40, 42 is a system control circuit for controlling the entire system, 43 is a continuous photo mode setting switch, and 44 is a release switch.

The basic operation of FIG. 6 will be described. The image pick up circuit 31 converts a subject image from the photographing optical system 30 into an electric signal, and outputs a video signal to the recording signal processing circuit 32. The recording signal processing circuit 32 performs the A/D conversion, and the data compression as required, adds error correction codes necessary for recording, and outputs to the switch 33 after the recording modulation. The switch 33 is controlled by the system control circuit 42, and the output of the recording signal processing circuit 32 is alternately applied to the magnetic heads 34 or 35 at predetermined timings. The system control circuit 42 also drives the drum motor 37 and the capstan motor 40 via the motor driving circuit 41, and rotates the rotary drum 36 and the capstan 39 at predetermined speeds, as will be detailed later. The rotation of the capstan 39 causes the magnetic tape 38 to run in the longitudinal direction, while at the same time, the rotary drum 36 rotates so that the magnetic heads 34, 35 scan the magnetic tape 38 in the slanting direction to the longitudinal axis line. This is a so-called helical scan method whereby, oblique tracks as shown in FIG. 6 are sequentially formed.

Figure 7:
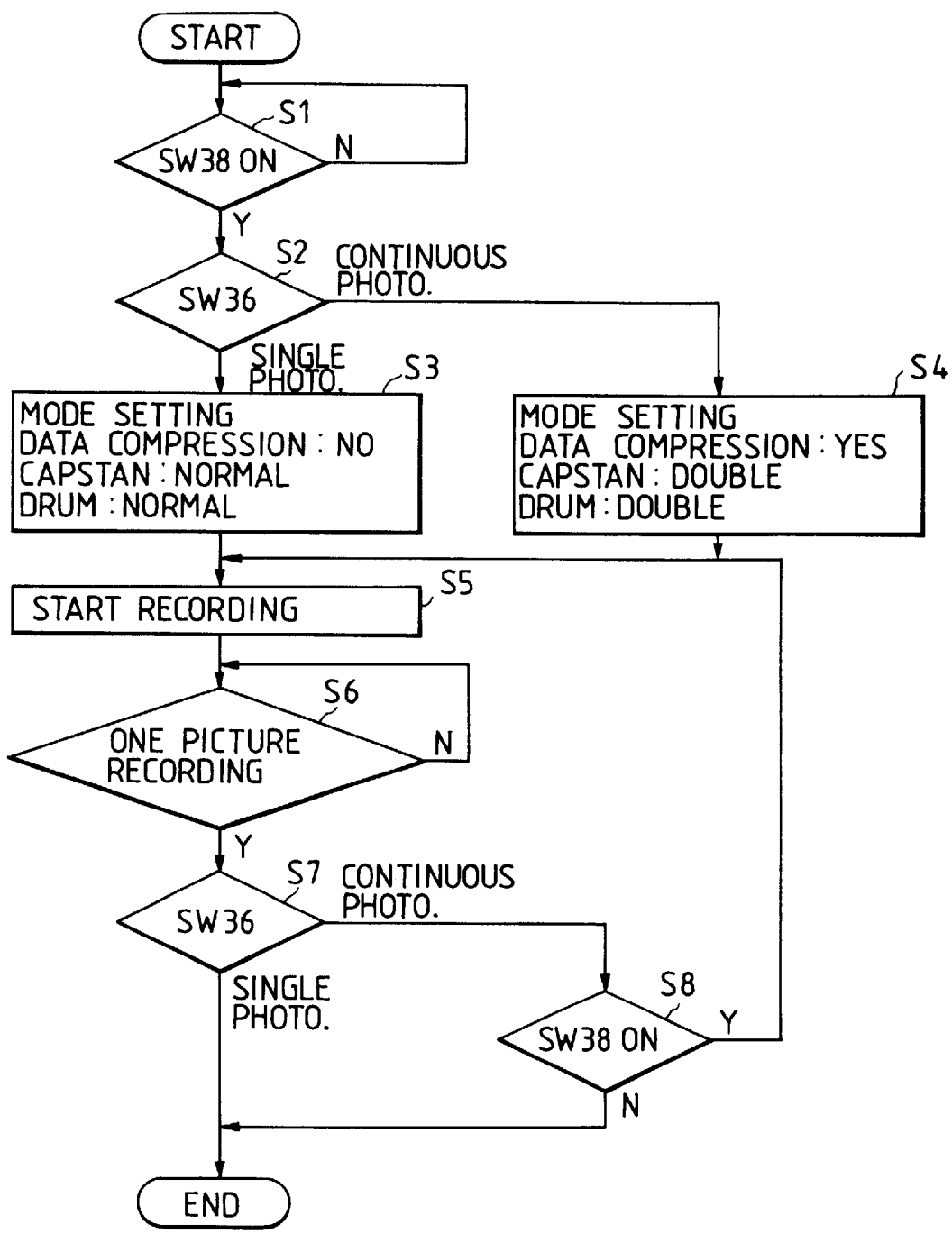
FIG. 7 is a flowchart showing the operation of above embodiment.

Next, the characteristic operation of this embodiment will be described with reference to a flowchart as shown in FIG. 7. The process starts, and firstly, waits for an operation of the release switch 44 (S1). If the release switch 44 is operated, the single or continuous photo mode is determined from a state of the continuous photo mode setting switch 43 (S2).

In the single photo mode, the recording signal processing circuit 32 is set to an operation mode without data compression, and the motor driving circuit 41 is set to rotate the capstan 29 and the rotary drum 36 at normal speeds (S3). In the continuous photo mode, the recording signal processing circuit 32 is set to an operation mode with data compression, and the motor driving circuit 41 is set to rotate the capstan 39 and the rotary drum 36 at double normal speeds (S4).

After the mode setting (S3 or S4), the recording is started. That is, a video signal is output from the image pick up circuit 31, and stored temporarily in an internal memory by the recording signal processing circuit 32. And in the continuous photo mode, the recording signal processing circuit 32 reads sequentially image data stored in the internal memory, performs a predetermined compression processing (e.g., two-dimensional discrete cosine transform), the addition of error correction codes, the modulation for recording, and so on, and outputs data for recording sequentially onto the magnetic tape 38. In the single photo mode, however, it of course does not make the data compression, but performs the addition of error correction codes and the modulation for recording, to record sequentially onto the magnetic tape 38.

In the continuous photo mode, the amount added error correction codes is increased.

After termination of the recording of one picture (S6), if reference to the continuous photo mode setting switch 43 (S7) indicates the single photo mode, the recording is terminated, while if it indicates the continuous photo mode, the recording is repeated by returning to S5, as long as the release switch 44 is on (S8).

In this embodiment, as the rotary drum 37 and the magnetic tape 38 are run at double speeds in the continuous photo mode, the transmission rate is doubled compared to the normal speed. In this way, if the transmission rate is doubled, normal uncompressed image data of one frame can be recorded at about 2.4 seconds (=4.8 seconds * ½). In order to have about 4 frames per second as a continuous photo speed, the data compression of about 1/10 is necessary, and such compression ratio can be accomplished sufficiently with the two-dimensional discrete cosine transform (CCITT recommendations H.261). At the continuous photographing, the data compression ratio of about 1.4 can be obtained by making the offset sampling for field acquisition, so that the continuous photographing of about 2 frames per second can be achieved.

Note that the compression ratio can be variably set in accordance with a continuous photo speed.

In this embodiment, pilot signals of four frequencies fp1, fp2, fp3 and fp4 are recorded in a part of track Tp, as shown by slanting lines in FIG. 6, so as to discriminate between records of the continuous photo and those of the single photo, for example, by the difference between a recording sequence of fp1, fp2, fp3 and fp4, and a reverse recording sequence of fp4, fp3, fp2 and fp1.

When reproducing a single photo record, signals can be reproduced without the tracking control by increasing the number of rotations for the rotary head, and by scanning the same track a plurality of times. When reproducing continuous photo records, signals can be reproduced without the tracking control by making the tape feed speed half that at the recording, by scanning the same track a plurality of times.

As can be clearly understood from the above description, according to this embodiment, high speed continuous recording can be fulfilled without increasing the consumption power at the single recording.

Another preferred embodiment according to the present invention will be described with reference to FIGS. 8 to 11.

The present embodiment is an electronic still camera using a magnetic tape Tp contained in a cassette as a recording medium, to which the present invention is applied.

Figure 8:
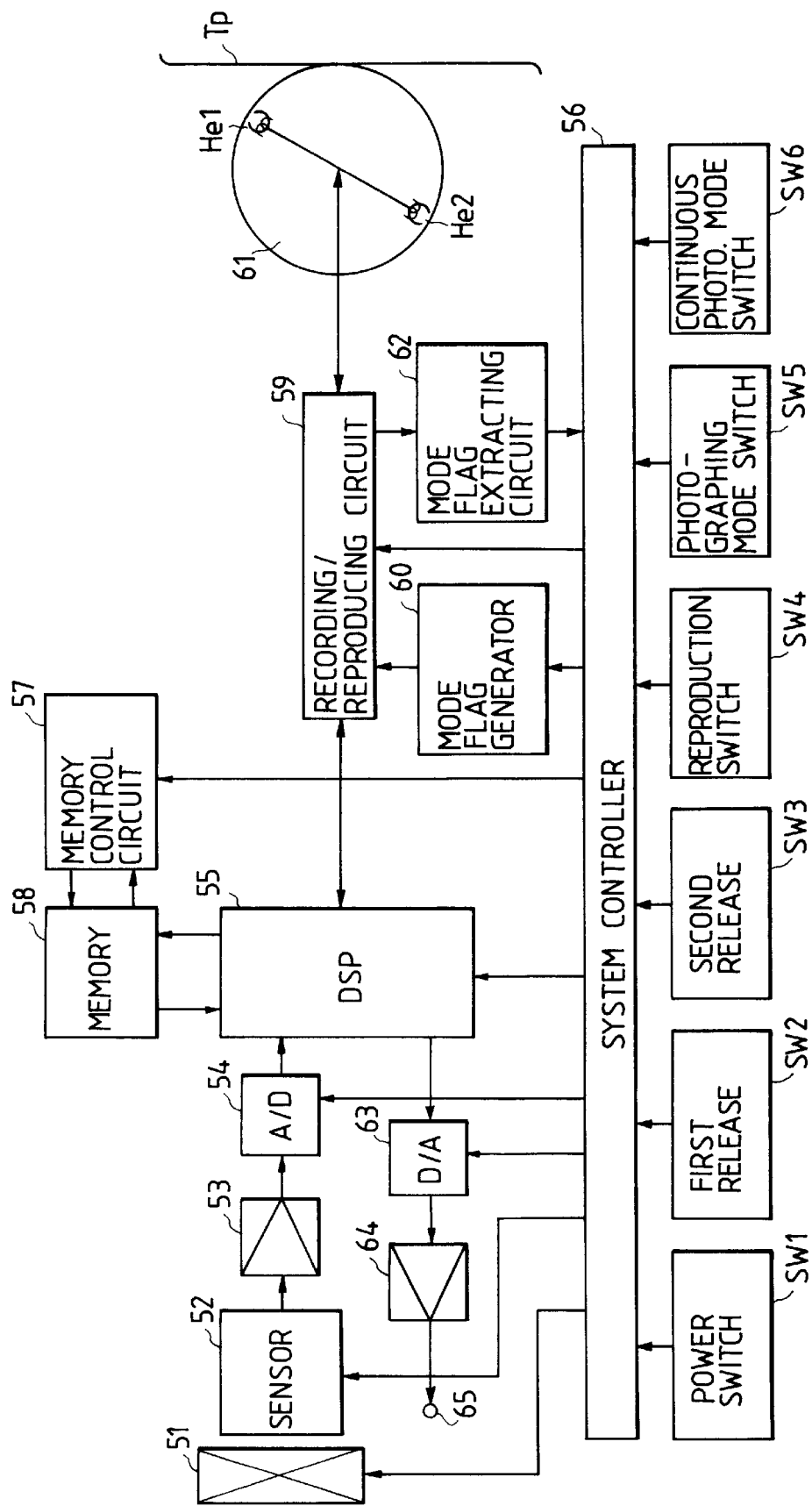
FIG. 8 is a block diagram of an embodiment according to the present invention.

FIG. 8 is a block diagram showing an electrical configuration of the electronic still camera according to the present invention, in which the light picked up from a subject enters via an optical system 51 having an automatic iris mechanism or an automatic focusing mechanism into a sensor 52 composed of CCD, and converts from an optical an electric entity, and a video signal obtained thereby is amplfied by a predetermined amount in a preliminary amplifier 53 and then converted into digital signals consisting of a predetermined number of bits in an A/D (analog/digital) converter 54. Note that the sampling frequency of the A/D converter 54 in this example is the same as a driving frequency of the sensor 52 as above described, with the quantization bit being 8 bits.

Image data output from the A/D converter 54 as above described is supplied to a digital signal processing circuit (DSP) 55, where the digital processings such as the data compression, the addition of error correction codes (ECC), etc., are performed. That is, the DSP 55 comprises a processing block in the recording system for performing the data compression and the ECC addition at the recording mode, and a processing block in the reproduction system for performing the data expansion and the error correction at the reproduction mode, which blocks are suitably switched between the recording and reproducing modes by a system controller (thereafter called as "syscon") 56, as will be described later. The data compression ratio and the ECC adding amount in the recording block are set by the syscon 56 as above described, depending on the photographing or continuous photo mode. Note that any compression method can be used, such as DPCM or discrete cosine transform. On the other hand, the data expansion and the error correction in the reproduction block are set in accordance with a mode flag extracted from reproduced output.

Image data passing through the digital processing in the DSP 55 are once stored in memory circuit 58 having a storage capacity as much as at least two frames (four fields) composed of RAM or the like, which is controlled in a memory control circuit 57, and at the recording, supplied via the DSP 55 again as above described to a recording/reproducing circuit 59. Further, the memory control circuit 57 as above described performs a predetermined memory control, as will be described later, in accordance with an operation mode being set in the syscon as above described.

The recording/reproducing circuit 59 as above described is supplied with a mode flag output from a mode flag generator 60, which is added to, for example, a subcode area of image data, and supplied to the magnetic heads He1, He2 mounted on the rotary drum 61. As a result, image data and the mode flag are recorded obliquely onto the magnetic tape Tp. Note that the above mode flag is set in accordance with the photographing mode or continuous photo mode.

The recording/reproducing circuit 59 as above described is switched between the recording state and the reproducing state by the syscon 56, and in the recording state, supplies the image data and the mode flag to the magnetic heads He1, He2 alternately, as above described.

At the reproducing time, it amplifies by a predetermined amount the reproduction data from the magnetic heads He1, He2 as above described to be supplied to the DSP 55 as above described as well as a mode flag extraction circuit 62.

The mode flag extraction circuit 62 extracts the mode flag from the reproduction data supplied thereto, and supplies it to the syscon 56 as above described. The syscon 56 sets the data expansion ratio and error correction in the DSP 53 in accordance with the mode flag supplied thereto.

The reproduced image data to which the digital processing such as the error correction is applied in the DSP 55 are once stored in the memory circuit 58, and then read again, processed for the data expansion in DSP5, and converted into an analog signal in the D/A (digital-analog) converter 63.

Further, the reproduced analog image data is amplified by a predetermined amount in the amplifier 64, and output via an output terminal 65.

The syscon 56 as above described, in accordance with the setting of each operation switch connected thereto, controls not only the DSP 55, the memory control circuit 57 and, the recording/reproducing circuit 59, as above described, but also the automatic iris (AE) adjustment and the automatic focusing adjustment (AF) in the optical system 51 as above described, and the conversion operation such as the A/D conversion or the D/A conversion, as well as the operation of the sensor 52.

That is, the syscon 56 puts the whole system into a powered state in accordance with an operation of the power switch SW1, and performs the initial setting into the recording mode. It stands by the recording in accordance with an operation of first release switch SW2, and starts the operation in accordance with an operation of second release switch SW3.

Further, the syscon 56 sets the reproduction mode in accordance with an operation of reproduction switch SW4.

On the other hand, the syscon 56 sets the continuous photo or single photo mode in accordance with an operation of photographing mode setting switch SW5, and selectively sets the continuous photo mode into a first normal continuous photo mode and a second normal continuous photo mode, or a first long-time continuous photo mode and a second long-time continuous photo mode, in accordance with an operation of continuous photo mode setting switch SW6.

Here, in this embodiment, the first normal continuous photo mode as above described is such that sixteen sheets of image data picked up by the rate of four fields per second in four seconds before the above-mentioned second release switch SW3 is turned off, i.e., the continuous photo operation is stopped, are compressed to one-fourth data, and stored in the above-mentioned memory circuit 8, and after the SW3 is turned off, the sixteen sheets of image data are recorded onto a magnetic tape Tp.

The second normal continuous photo mode as above described is such that sixteen sheets of image data picked up by the rate of two fields per second in eight seconds before the above-mentioned second release switch SW3 is turned off, are compressed to one-fourth data, and stored in the above-mentioned memory circuit 8, and after the SW3 is turned off, the sixteen sheets of image data are recorded onto a magnetic tape Tp.

Further, the first long-time continuous photo mode as above described is such that thirty two sheets of image data picked up by the rate of four fields per second in eight seconds before the above-mentioned second release switch SW3 is turned off, are compressed to one-eighth data, and stored in the above-mentioned memory circuit 58, and after the SW3 is turned off, the thirty two sheets of image data are recorded onto a magnetic tape Tp.

The second long-time continuous photo mode as above described is such that thirty two sheets of image data picked up by the rate of two fields per second in sixteen seconds before the above-mentioned second release switch SW3 is turned off, are compressed to one-eighth data, and stored in the above-mentioned memory circuit 58, and after the SW3 is turned off, the thirty two sheets of image data are recorded onto a magnetic tape Tp.

Note that in this embodiment, at the single photo mode, image data are once stored in the above-mentioned memory circuit 58 without compression, and thereafter, recorded onto a magnetic tape Tp.

Next, the operation of an electronic still camera with the above constitution will be described.

Figure 9:
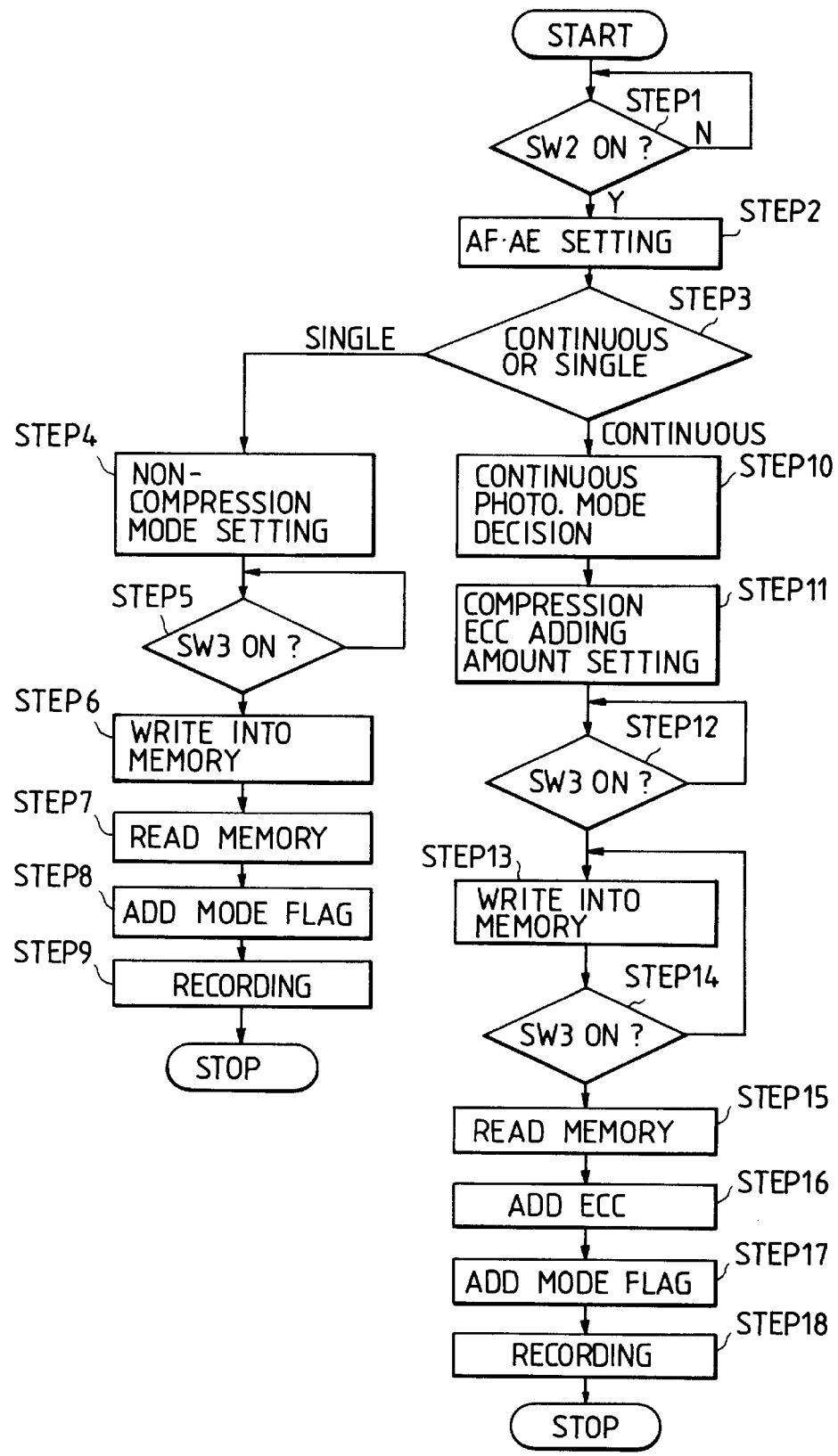
FIG. 9 is a flowchart showing the operation of above embodiment.

First, in the recording mode, as shown in a flowchart of FIG. 9, the process waits for the first release switch SW2 to be turned on (step 1), and when it is turned on, the automatic iris adjustment and the automatic focusing adjustment in the above optical system 51 are performed (step 2). Further, a determination is made whether the photo mode is continuous or single (step 3), and in the single photo mode, the above-mentioned DSP 55 is set to the non-compressed mode (step 4). Thereafter, the process waits for the second release switch SW3 to be operated (on) (step 5), and when it is turned on, a video signal obtained from the sensor 52 is digitized and written into the memory circuit 58 as above described in the non-compressed state (step 6). Image data of one picture is written into the memory, then read out (step 7), and attaches to the read image data the mode flag "φφ" indicating that the image data is in the single photo (step 8).

Thereafter, image data are recorded together with the above mode flag "φφ" onto the magnetic tape Tp.

On the other hand, when the photo mode is continuous at the above step 3, the continuous photo mode, which is set by the continuous photo mode setting switch SW6 as above described, is selected (step 10), and the compression ratio and ECC adding amount in the above DSP 55 are set in accordance with the continuous photo mode setting.

That is, in the first and second normal continuous photo modes, the compression ratio is set to one-fourth, while in the first and second long-time continuous photo mode, the compression ratio is set to one-eighth, and the ECC adding amount is set at a larger value than that in the normal continuous photo mode.

Thereafter, the process waits for the second release switch SW3 to be turned on (step 12), and when it is turned on, image data compressed at a predetermined compression ratio as above described is written into the memory circuit 58 in a predetermined pattern in accordance with each continuous photo mode (step 13), and this process is continued until the second release switch SW3 as above described is turned off (step 14).

That is, in the first normal continuous photo mode, as shown in FIG. 10A, image data supplied by a rate of four fields per second are compressed to one-ninth, and sequentially recorded, and at the stage where the capacity of the memory circuit 58 becomes full, i.e., image data P17, PN, . . . following the seventeenth sheet are supplied and, old image data P1, P2, . . . are sequentially rewritten with new image data P17, P18, . . .

As a result, the memory circuit 58 as above described has only stored the newest sixteen sheets of image data P1–P16 (P3–P18) as shown in FIG. 11A.

Note that though the memory pattern into the memory circuit 58 in the first long-time continuous photo mode as above described is the same as that in the first normal continuous photo mode as above described, the memory circuit 58 as above described has only the newest thirty two sheets of image data, as the compression ratio of data is set to be one-eighth in the long-time continuous photo mode.

On the other hand, in the second normal continuous photo mode as above described, as shown in FIG. 10B, if image data supplied by a rate of four fields per second become the sixteenth sheet and the following, old image data in even numbers P2, P4, P6, . . . are rewritten with new image data P17, P18, . . . , in sequence, and after even numbered image data are all rewritten with even numbered new image data, odd numbered old image data P1, P3, P5, . . . are rewritten with odd numbered new image data P33, P35, P37, . . . , in sequence.

As a result, in this mode, the memory circuit 58 as above described always stores image data corresponding to a period of eight seconds (16 sheets) (e.g., P1, P3, . . . , P29, P31), as shown in FIG. 11B.

Also in the second long-time continuous photo mode as above described, the memory pattern into the memory circuit 58 is the same, but as the compression ratio of data is set to be one-eighth, the memory circuit 58 as above described always stores image data corresponding to a period of sixteen seconds (32 sheets) (e.g., P1, P3, P5, . . . , P63).

The storage into the memory circuit 58 for each continuous photo mode is continued while the second release switch SW3 is on, and when it is turned off, image data are read out from the oldest data sequentially (step 15). A predetermined amount of ECC, which is set in accordance with the compression ratio of each mode, is added to the image data read out (step 16), together with the mode flag "01", "10" or "11" indicating the mode of image data (step 17), and image data with the ECC and the mode flag added are sequentially recorded onto the magnetic tape Tp as above described.

On the other hand, in the reproduction mode, the mode flag is extracted from the reproduced data with each magnetic head He1, He2, as above described, in the mode flag extraction circuit 62, and based on the mode flag, the syscon 56 as above described sets and controls the processing such as the error correction in the DSP 55 as above described.

Thereafter, reproduced image data to which the error correction processing is applied are once stored into the memory circuit 58, read out sequentially, expanded based on the above mode flag in the DSP 55, converted into an analog signal by the D/A converter 63, amplified by a predetermined amount in the amplifier 64, and output via an output terminal 65.

As above described, according to this example, in the first and second normal continuous photo modes, and the first and second long-time continuous photo modes, as above described, the continuous photographing for recording sixteen or thirty two sheets of image data, immediately before the second release switch SW3 is turned off, can be implemented. Thereby, the continuous photographing can be accomplished without losing a shutter chance.

When the continuous photographing time is long, by storing an increased number of sheets in the memory circuit with an increased compression ratio, the long-time continuous photographing is enabled.

Further, according to the present invention, like in the second normal continuous photo mode and the second long-time continuous photo mode, image data corresponding to sixteen or thirty two sheets can be continuously photographed over a long time by replacing old image data with new image data intermittently.

In this embodiment, the ECC added to compressed image data read out from the memory circuit is not stored in the memory circuit, so that the capacity of memory circuit can be saved.

Note that the memory pattern of image data into the memory circuit in this example is naturally not limited to the above-mentioned one.

As can be clearly understood from the above description, according to the present example, when the continuous photographing operation is continued, by rewriting old image data stored in the memory means with new image data sequentially, newest image at the termination of the continuous operation can be left in the above memory means, whereby the continuous photographing is enabled without losing a shutter chance.

Further, if the compression ratio is variably set in accordance with a continuation time for the continuous photographing, the number of sheets storable in the memory means is increased, whereby the long time continuous photographing operation is fulfilled.

What is claimed is:

1. A recording apparatus for recording onto a recording medium, image data provided from image pickup means for picking up an image, said image pickup means having a plurality of image pickup operation modes, the recording apparatus comprising:

compression means for compressing individual blocks of the image data, said compression means changing its compression ratio in response to the image pickup operation mode of said image pickup means; and control means for changing error correction check codes to be added to the image data in response to the image pickup operation mode of said image pickup means.

2. A recording apparatus according to claim 1, wherein control means comprises a microcomputer.

3. A recording apparatus according to claim 1, wherein compression means comprises a plurality of compression circuits having different compression ratios, any one of which is selected in response to the change of the compression ratio.

4. A recording apparatus according to claim 1, wherein recording medium comprises a magnetic tape.

5. An image pick-up apparatus comprising:

(a) image pickup means for obtaining a video signal;

(b) an A/D converter for converting said video signal into a digital video signal;

(c) compression means for compressing the digital video signal converted by said A/D converter with a predetermined compression ratio;

(d) error correction addition means for adding error correction check codes in response to a mode of the image pickup operation of said image pickup means;

(e) recording means for recording the digital video signal compressed by said compression means onto a recording medium; and (f) control means for changing the compression ratio of said compression means in response to the mode of the image pickup operation of said image pickup means.

6. An image pickup apparatus according to claim 5, wherein said control means includes means for changing operation speed of said recording means in accordance with the change of the compression ratio of said compression means.

7. An image pick up apparatus according to claim 6, wherein said recording means comprises a rotary magnetic head and means for transporting a tape.

8. An image pick up apparatus according to claim 5, wherein pick up means comprises a CCD.

9. A recording apparatus in which image data converted from image pickup light provided by a photographing operation are compressed and stored into memory means for storing data, and then image data output from the memory means are recorded onto a recording medium, characterized in that:

error correction addition means for adding error correction check codes in response to a mode of the photographing operation, wherein the compression ratio of the compression of the image data is changed in response to a mode of the photographing operation.

10. A recording apparatus according to claim 9, wherein said recording means comprises a magnetic tape.

11. An image processing apparatus, comprising:

(a) image pickup means for obtaining image data, said image pickup means having a plurality of image pickup operation modes;

(b) error correction means for adding error correction check codes to the image data, said error correction means being able to attain different error correction abilities; and (c) means for changing the error correction ability of said error correction means in response to change of the image pickup operation mode of said image pickup means.

12. An apparatus according to claim 11, wherein said operation setting means includes a manual operation switch.

13. An image processing apparatus comprising:

(a) image pickup means for obtaining image data, said image pickup means having a plurality of image pickup operation modes;

(b) compression means for compressing the image data, said compression means being able to attain different compression ratios;

(c) error correction means for adding error correction check codes to the image data, said error correction means being able to attain different error correction abilities; and (d) means for changing the error correction ability of said error correction means and the compression ratio of said compression means, in response to change of the image pickup operation mode of said image pickup means.

* * * * *

UNITED STATES PATENT AND TRADEMARK OFFICE
CERTIFICATE OF CORRECTION

PATENT NO. : 5,875,280
DATED : February 23, 1999
INVENTOR(S) : Kan Takaiwa, Saburo Nakazato It is certified that error appears in the above-identified patent and that said Letters Patent are hereby corrected as shown below:

Col. 2, line 34, delete "in".
Col. 5, line 19, delete "descrived" and insert -- described --.
Col. 8, line 37, after "mode," insert -- and --.
Col. 10, line 15, after "amount" insert -- of --.
Col. 10, line 54, after "recording," insert -- and --.
Col. 13, line 62, after "only" insert -- stored --.

Signed and Sealed this

Eighteenth Day of January, 2000

Attest:

Attesting Officer

Q. TODD DICKINSON

Commissioner of Patents and Trademarks